United States Patent Office 2,912,560
Patented Nov. 10, 1959

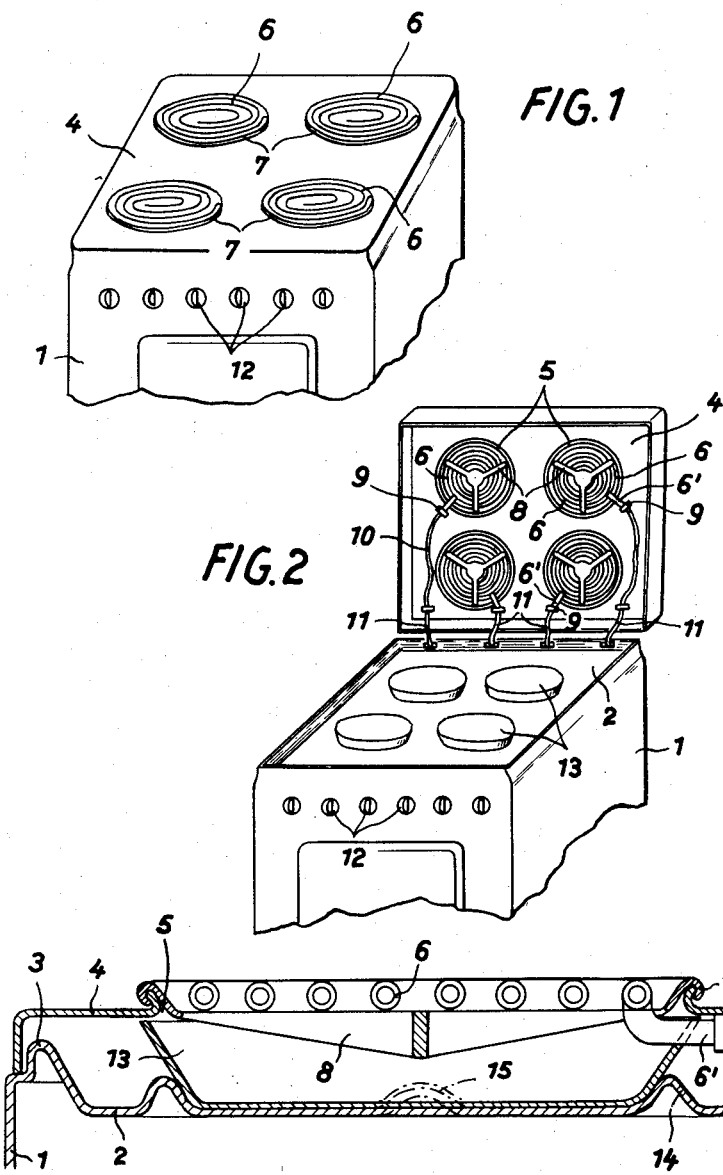

2,912,560

ELECTRIC COOKING STOVES

Willi Singelmann, Oberderdingen, Wurttemberg, Germany

Application July 22, 1957, Serial No. 673,482

Claims priority, application Germany July 20, 1956

4 Claims. (Cl. 219—37)

The present invention relates to new improvements in electric cooking stoves and more particularly to such stoves in which the heating plates are made of annular or coiled heating elements with apertures between the individual rings or coil turns thereof.

A considerable disadvantage of such stoves is the fact that any food or other material boiling over will run through the apertures between the individual rings or coil turns of such heating plates and will subsequently dry out and become incrusted on the inner cover plate of the stove underneath the heating elements. The removal of such incrusted dirt from the stove is a rather messy and difficult operation.

In order to overcome this deficiency, removable radiation-deflecting plates have in the past been provided underneath the heating plates. To gain access to these deflecting plates, the heating plates were hinged so as to be upwardly pivotable, and the deflecting plates were mounted on crossed bars or other supports underneath the heating plates which were secured to the main stove plate. Such pivotable construction of the individual heating plates complicates the stove construction considerably and also requires intricate electric connecting elements for supplying the electric current to the heating plates. Furthermore, the deflecting plates of such stove construction can only be of a considerably smaller diameter than the openings in the upper stove plate in which the pivotable heating plates are mounted. Therefore, they can only receive a portion of the overflow of the material cooking on the heating plates. There is also a considerable danger that, in the attempt to remove one of the deflector plates from its position underneath the upwardly tilted heating plate, the material collected in the deflecting plate will be partly spilled out since the deflecting plate has to be lifted out of the stove in an oblique position.

It is also known to provide the heating plates in a relatively fixed position within the openings of an upper stove plate which is upwardly pivotable in its entirety. Such construction has the advantage that the inner cover plate of the stove is more easily accessible for cleaning. However, it is still rather difficult to remove the boiled-over material from the inner cover plate, particularly if it has become incrusted thereon.

It is an object of the present invention to provide an electric cooking stove of the last-mentioned type in which the individual heating plates are mounted in a relatively fixed position within the openings in the upper stove plate which is upwardly pivotable as a unit, but in which individual collecting cups or pans are loosely resting on the bottom of the inner cover plate on which suitable projections are provided for maintaining the collecting pans in the proper central position relative to the heating plates when the latter are tilted downwardly. According to the invention, these individual collecting pans may also be designed so as to act as radiation-deflecting plates and may be made of such dimensions that they will extend underneath the entire area of the openings in the upper stove plate so that they will collect the entire possible overflow of material spilled or boiled over upon the heating plates. Thus, no material can possibly drop upon the inner cover plate of the stove itself and this plate will always remain clean of any incrustation. Apart from the centering projections on the inner cover plate there is no need for any means for supporting or securing the collecting pans. When the upper stove plate with the heating plates therein is tilted upwardly, each individual collecting pan is easily accessible and may be lifted out of the stove without tilting and therefore without any danger that its liquid contents might be spilled. These relatively small and plain pans may also be cleaned outside of the stove much more easily and thoroughly then the fixed inner cover plate of the stove.

Further objects, features, and advantages of the present invention will be apparent from the following detailed description thereof, particularly when read with reference to the accompanying drawings of one preferred embodiment of the invention, in which—

Fig. 1 shows a perspective view of the upper part of an electric stove according to the invention;

Fig. 2 shows a perspective view of the same stove with the upper stove plate in the upwardly pivoted position; while Fig. 3 shows a cross section of one heating plate with its collecting pan underneath.

Referring to the drawings, the housing 1 of the electric stove consisting of enameled steel plate has a troughlike inner cover plate 2 with upwardly projecting edges 3. These projecting edges 3 of the inner plate 2 are adapted to be encompassed by the downwardly projecting edges of the upper stove plate 4 which is pivotably secured by hinges at the rear edge thereof to the rear wall of housing 1 so that this entire plate 4 may be tilted upwardly to the position as illustrated in Fig. 2, in which position plate 4 may be temporarily secured by brace rods not shown.

Stove plate 4 is provided with a suitable number of circular openings 5 in each of which a heating element 6 is mounted. These heating elements 6 may be of a construction known as such and each may, for example, consist of a flat heating tube made in the form of a spiral coil or other suitable shape and consisting of a tubular jacket of steel plate with heating conductors embedded therein and insulated therefrom. Each of this gratelike heating element is fitted into a supporting ring 7 which is connected to the circular edge of one of the openings 5 and also surrounds a supporting spider 8. The ends 6' of heating elements 6 which are connected to the electric power supply are provided at the lower side of stove plate 4 and are secured thereto either directly or indirectly, for example, by means of clamps 9 or the like. These ends 6' are connected to short cables 10 which are likewise secured to the lower side of stove plate 4 and extend to a point near the pivotal axis of plate 4. At these points, cables 10 are connected to flexible cable portions 11 which lead within the area of the projecting edges 3 into the lower part of the stove where they are connected to other cables leading to control switches which may be operated by control knobs 12 mounted on the front wall of housing 1.

As illustrated particularly in Fig. 3, the inner cover plate 2 supports a plurality of collecting pans 13 of a number in accordance with the number of openings 5 in stove plate 4 and heating elements 6 therein. These collecting pans which preferably are designed so as also to serve as deflectors rest loosely on the upper surface of plate 2 and are each maintained by suitable projections on plate 2 in the proper central position with respect to one of heating elements 6 when the latter are in the downwardly tilted position. According to the embodiment of the invention as shown in the drawings, these projections may consist of annular beads 14 which are impressed into plate 2, although they may also consist of three or more locating knobs for each collecting pan 13 which are impressed into plate 2 or are secured to its upper surface. In place of such projections engaging with the rim of each pan 13, plate 2 may also be provided with a single locating projection 15 which is disposed centrally underneath each heating element 6 when in the downwardly tilted position, as indicated in dotted lines in Fig. 3. In this case, each collecting pan 13 is provided with a central depression in its lower bottom surface which is adapted to be placed upon one of the projections 15.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. An electric cooking stove comprising a stove housing having an upper plate with edges projecting upwardly therefrom, a cover plate pivotally mounted on said housing adapted to be pivoted from its normal horizontal position above and substantially parallel with said upper plate and spaced therefrom to a substantially vertical position, said cover plate having a plurality of circular openings therein, a plurality of heating plates each having apertures extending therethrough and mounted within each of said openings, and a plurality of collecting pans corresponding to the number of heating plates loosely resting on said upper plate for collecting any material falling through said apertures in said heating plates, and a plurality of upwardly projecting members on said upper plate for locating each of said collecting pans centrally underneath one of said heating plates when said heating plates are in their normal horizontal position, and wherein said projecting members on said upper plate consist of indentations pressed into the lower surface of said plate.

2. An electric cooking stove comprising a stove housing having an upper plate with edges projecting upwardly therefrom, a cover plate pivotally mounted on said housing adapted to be pivoted from its normal horizontal position above and substantially parallel with said upper plate and spaced therefrom to a substantially vertical position, said cover plate having a plurality of circular openings therein, a plurality of heating plates each having apertures extending therethrough and mounted within each of said openings, and a plurality of collecting pans corresponding to the number of heating plates loosely resting on said upper plate for collecting any material falling through said apertures in said heating plates, and a plurality of upwardly projecting members on said upper plate for locating each of said collecting pans centrally underneath one of said heating plates when said heating plates are in their normal horizontal position, and wherein said projecting members on said upper plate consist of annular beads pressed into the lower surface of said plate and each having an inner diameter substantially corresponding to the outer diameter of the bottom portion of one of said collecting pans.

3. An electric cooking stove comprising a stove housing having an upper plate with edges projecting upwardly therefrom, a cover plate pivotally mounted on said housing adapted to be pivoted from its normal horizontal position above and substantially parallel with said upper plate and spaced therefrom to a substantially vertical position, said cover plate having a plurality of circular openings therein, a plurality of heating plates each having apertures extending therethrough and mounted within each of said openings, and a plurality of collecting pans corresponding to the number of heating plates loosely resting on said upper plate for collecting any material falling through said apertures in said heating plates, and a plurality of upwardly projecting members on said upper plate for locating each of said collecting pans centrally underneath one of said heating plates when said heating plates are in their normal horizontal position, and wherein said collecting pans are designed so as also to serve as radiation deflectors.

4. An electric cooking stove comprising a stove housing having an upper plate with edges projecting upwardly therefrom, a cover plate pivotally mounted on said housing adapted to be pivoted from its normal horizontal position above and substantially parallel with said upper plate and spaced therefrom to a substantially vertical position, said cover plate having a plurality of circular openings therein, a plurality of heating plates each having apertures extending therethrough and mounted within each of said openings, and a plurality of collecting pans corresponding to the number of heating plates loosely resting on said upper plate for collecting any material falling through said apertures in said heating plates, and a plurality of upwardly projecting members on said upper plate for locating each of said collecting pans centrally underneath one of said heating plates when said heating plates are in their normal horizontal position, and wherein the upper edge of each of said collecting pans has a diameter larger than the diameter of said openings in said cover plate.

References Cited in the file of this patent

UNITED STATES PATENTS

| 968,942 | Hartig et al. | Aug. 30, 1910 |
| 1,456,873 | Forshee | May 29, 1923 |
| 2,560,959 | Klein | July 17, 1951 |
| 2,640,968 | Lehr | June 2, 1953 |
| 2,693,523 | McCormick | Nov. 2, 1954 |

FOREIGN PATENTS

| 1,006,434 | France | Apr. 23, 1952 |